United States Patent [19]

Marbach

[11] 4,261,672
[45] Apr. 14, 1981

[54] SUCTION HEAD FOR A PNEUMATIC PLUG-SUCTION CONVEYOR

[75] Inventor: Herbert Marbach, Ahrensburg, Fed. Rep. of Germany

[73] Assignee: Claudius Peters AG, Hamburg, Fed. Rep. of Germany

[21] Appl. No.: 57,100

[22] Filed: Jul. 12, 1979

[30] Foreign Application Priority Data

Jul. 29, 1978 [DE] Fed. Rep. of Germany ....... 2833364

[51] Int. Cl.³ .............................................. B65G 53/24
[52] U.S. Cl. ......................................... 406/50; 406/152
[58] Field of Search ....................... 406/12, 50, 93, 94, 406/151, 152, 153

[56] References Cited

U.S. PATENT DOCUMENTS

| | | | |
|---|---|---|---|
| 2,791,470 | 5/1957 | Jolley | 406/152 |
| 2,880,036 | 3/1959 | Larsson et al. | 406/152 X |
| 3,063,755 | 11/1962 | Wijdeveld et al. | 406/153 X |

FOREIGN PATENT DOCUMENTS 512141  6/1976  U.S.S.R. .................................. 406/50

Primary Examiner—Jeffrey V. Nase
Attorney, Agent, or Firm—Otto John Munz

[57] ABSTRACT

An intermittently operating pneumatic plug-conveyor has a pipe-shaped suction head for fluid material, which passes therethrough in a column, which resists dispersion. The conveyor is provided with an adjustable slot, a manifold in alignment with the slot, gas connection supports, and a timer-controlled valve system of such proportions, that the resistance of the column of the material located in the suction head relative to atmospheric pressure, is greater than the combined air-resistance of the gas supports with the adjustable slot and the valve; gas nozzles from pressurized gas supply controlled by a magnetic valve with a timer are arranged below the manifold and a back-up flow protection is provided at the receiving input.

5 Claims, 2 Drawing Figures

SUCTION HEAD FOR A PNEUMATIC PLUG-SUCTION CONVEYOR

FIELD OF THE INVENTION

The invention relates to a suction head for a pneumatic plug-suction conveyor.

PRIOR ART

By pneumatic plug conveyor is understood a further development of the pneumatic push conveyor with a continuous interruption of the flow of material. The plug conveyor has been used for several years with success, among other things for the pneumatic conveyance of powder and granular products. Because of the low conveyance speed it is especially suitable for sticky, breakable and friction-sensitive materials. These types of conveyed materials can be carefully transported at a high rate.

The pneumatic plug conveyor systems comprise a sender, a conveying line, a compressor, a filter and a control panel.

In contrast to a push conveyor, a pneumatic plug conveyor for a column of material is divided into short sections, so-called plugs, which are transported separately without mixing through a conveyance line. The individual plugs are tightly-packed pourings of solid matter within the conveyance pipe.

Methods and apparatus for plug conveyance are known, in which the conveyance takes place with pressure pneumatics or with suction pneumatics. According to the state of the art, the structure of a pneumatic plug conveyor corresponds to that of a pneumatic push conveyor. For example, for the purpose of plug production behind the sender, air is alternately introduced into the conveyance line by a pressurized container conveyor, controlled by valves or flaps, to push forward the column of material in the form of individual sections called plugs. At least one valve of these arrangements operates in the flow of dust and is thereby subjected to wear. Analogously, the suction conveyor removes the material from the pile of poured material and the plugs are suctioned or aspirated through the conveying line.

OBJECTS OF THE INVENTION

The primary object of the invention is to create a pneumatic plug conveyor whose blocking members are located in the flow of pure gas, protected from wear, away from the flow of solid material.

In a pneumatic suction system the opportunity is present to achieve the formation of the plugs by using the vacuum. Assuming that the conveyed material can be mechanically or pneumatically suctioned into the suction tube in loose form and there can form a column of conveyed material, the suction process can be interrupted to form a plug of conveyed material if gas is introduced into the conveyed column of material at a suitable location. According to the invention, this is effected with the aid of a pipe-like suction head, which has an extension to which at least one gas connection support with a magnetic valve is connected. The extension is connected on the gas side with the interior of the conveying pipe by means of an adjustable slot. The length of the suction head between the receiving end and the extension has dimensions such that the resistance of the column of material in the suction head relative to the atmosphere is greater than the resistance of the combination of gas connection supports with the adjustable slot and the magnetic valve. The vacuum prevailing in the suction pipe and suction head suctions a column of flowable conveyed material into the suction head. A magnetic valve is opened by means of an adjustable timing device and suctions air through the slot at the extension of the suction head. This air divides the conveyed column of material and accelerates the conveyed material column section located above the point of separation as a plug toward the conveyance goal. The portion of the conveyed material column located below the point of separation rigidifies because of its inertia and is held in this pipe section by the prevailing static vacuum at the height of the slot of the extension. As a result of the greater resistance of this lower conveyed column-section material there is no air breakthrough. As soon as the magnetic valve closes, the cycle repeats itself.

According to a further characteristic of the invention, nozzles for compressed gas, controlled by magnetic valves, are arranged beneath the extension of the suction head. If a conveyed material is used which is difficult to separate, such as a pasty mass, the insufficient prior separation by suction air of the column of the conveyed material can be perfected by these nozzles.

For conveyed material which flows easily, such as argillaceous earth, a return prevention device is provided at the receiving end of the suction head, for example a ball.

When the suction head according to the invention is employed, it is advantageous to arrange all armatures sensitive to wear outside of the flow of solid material.

DESCRIPTION OF THE PREFERRED EMBODIMENT

Figure 1:
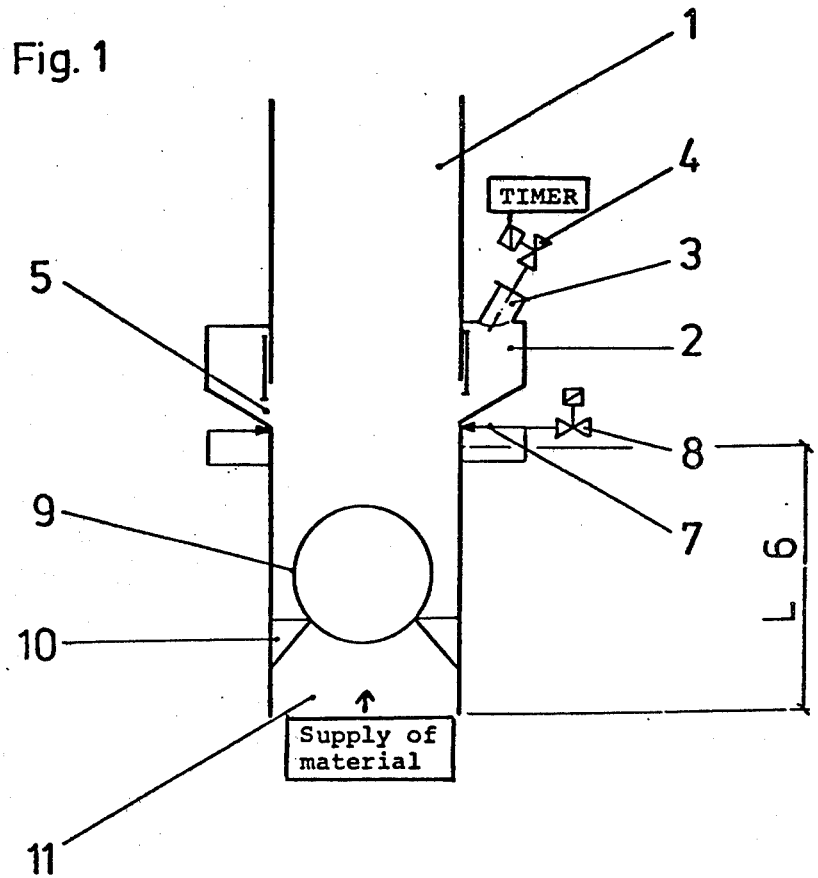
FIG. 1 shows schematically an embodiment of the suction head according to the invention.
Figure 2:
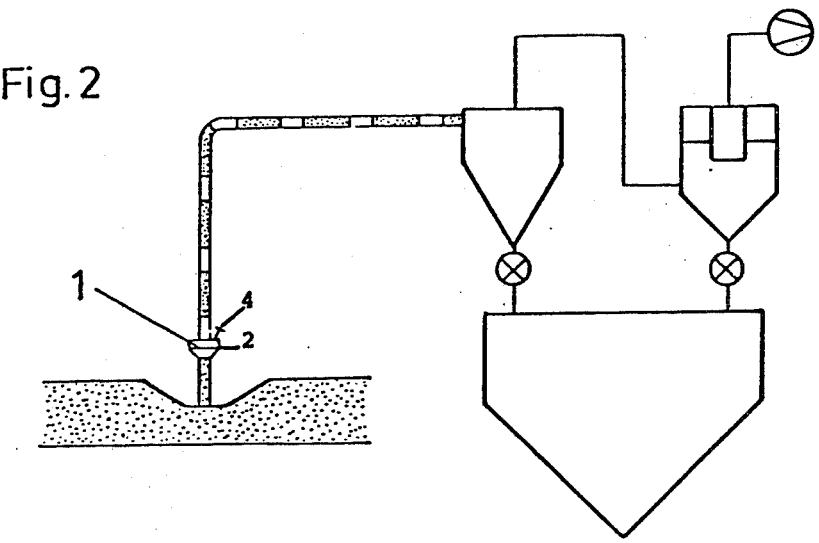
FIG. 2 shows the plan of a pneumatic plug suction conveyor with a suction head according to the invention.

The suction head 1, shown on FIG. 1, represents the lowest portion of a suction conveyor and is detachably connected therewith by conventional means. The pipe-like suction head has in its upper area a suction head manifold-type enlargement to which are connected to one or more connection supports 3 for air which may be three in number, for example. These connection supports 3 are connected with an automatically and remotely controllable armature, for example a magnetic valve 4.

In alignment with the manifold enlargement adjacent to the suction head, the suction head is provided with an adjustable slot 5.

The lower length 6 of the suction head has dimensions such that the resistance relative to the atmosphere, occurring in this section, is greater than the resistance represented by the combination of the suction head slot, with the connection supports and with the magnetic valve.

Optionally, for conveyed columns of material, which are difficult to separate, are arranged, beneath the extension 2, pressurized gas nozzles 7, equipped with a magnetic valve 8.

For very fluid conveyed materials a return flow prevention is employed, such as a ball 9 with a corresponding seat 10.

By means of the negative pressure prevailing in the suction device the conveyed material is suctioned from a pile through the receiving end 11 of the suction head. A setable timer controls the opening of the magnetic valve 4. After the opening, air from the atmosphere is suctioned through the connection supports because of the negative pressure prevailing in the suction system. This air separates the column of the conveyed material formed in the suction head, so that only the section of the column of the conveyed material situated above the point of separation, is accelerated toward the conveyance destination. The section of the column of the conveyed material located below the point of separation remains at rest until the magnetic valve closes again.

I claim:

1. A pneumatic plug suction conveyor of a column of fluid material comprising:

a pipe-shaped suction head having a material receiving inlet end with an adjustable slot in the side thereof spaced from the material receiving end, and a discharge end;

a suction means connected with the discharge end to produce a suction in the suction head to draw material through the inlet end and thence the discharge end;

a manifold enlargement on the suction head, in communication with the slot;

at least one gas connection support for introducing gas into the manifold;

a first magnetic valve, out of the path of material flow, connected to said support, operable intermittently to introduce air into the suction head to cause formation of plugs of the material flowing therethrough; and the length of the suction head between the inlet end and the manifold-enlargement having dimensions such, that the resistance to flow of the column of material located in the suction head relative to atmospheric pressure is greater than the combined air-resistance of the gas connection supports with the adjustable slot and the magnetic valve, whereby the material is separated into plugs when the magnetic valve is opened.

2. A pneumatic plug suction head conveyor as claimed in claim 1, further comprising:

at least one pressurized gas nozzle with at least one second magnetic valve arranged therewith below the manifold enlargement, said second valve controlling said nozzle for introducing pressure into the suction head to facilitate flow of the plugs of material.

3. A pneumatic suction head conveyor as claimed in claim 1 or 2, further comprising a return flow prevention means on the inlet end.

4. A pneumatic suction conveyor as in claim 3, wherein:

the return flow prevention means comprises a ball and seat.

5. A pneumatic plug suction conveyor as in 1 and 2, further comprising:

a timer to control the operation of the first magnetic valve.

* * * * *